US012782904B2

(12) United States Patent
Shirai

(10) Patent No.: US 12,782,904 B2
(45) Date of Patent: Nov. 3, 2026

(54) NUMERICAL CONTROL DEVICE AND COMPUTER READABLE STORAGE MEDIUM

(71) Applicant: Fanuc Corporation, Minamitsuru-gun (JP)

(72) Inventor: Kenichiro Shirai, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 433 days.

(21) Appl. No.: 18/286,154

(22) PCT Filed: Apr. 15, 2021

(86) PCT No.: PCT/JP2021/015521
§ 371 (c)(1),
(2) Date: Oct. 9, 2023

(87) PCT Pub. No.: WO2022/219760
PCT Pub. Date: Oct. 20, 2022

(65) Prior Publication Data
US 2024/0184264 A1 Jun. 6, 2024

(51) Int. Cl.
*G05B 19/402* (2006.01)

(52) U.S. Cl.
CPC .. *G05B 19/402* (2013.01); *G05B 2219/50357* (2013.01)

(58) Field of Classification Search
None
See application file for complete search history.

(56) References Cited

U.S. PATENT DOCUMENTS 5,038,011 A * 8/1991 Nakayama ............... B23H 7/02 219/69.12
5,242,555 A * 9/1993 Buhler ..................... B23H 7/06 204/297.06

(Continued)

FOREIGN PATENT DOCUMENTS

CN 106573322 A 4/2017
JP 01228727 A 9/1989

(Continued)

OTHER PUBLICATIONS

International Search Report and Written Opinion for International Application No. PCT/JP2021/015521, dated May 18, 2021, 5 pages.

(Continued)

*Primary Examiner* — Jason Lin
(74) *Attorney, Agent, or Firm* — BUCHANAN INGERSOLL & ROONEY PC

(57) ABSTRACT

A numerical control device that controls electric discharge machining includes: a program path creation unit that analyzes a machining program consisting of a plurality of machining processes including rough machining, semi-finishing machining, and final finishing machining and creates a program path for each of the machining processes; a machining condition storage unit that stores a plurality of machining conditions suited to the machining processes and at least one machining condition suited to an unmachined part; and a machining condition change unit that, when an unmachined part occurs in a prior machining process, changes a machining condition for the current machining processes to a machining condition adapted to the unmachined part.

8 Claims, 17 Drawing Sheets

(56) References Cited

U.S. PATENT DOCUMENTS

| | | | | | |
|---|---|---|---|---|---|
| 5,418,344 | A * | 5/1995 | Magara | B23H 7/065 219/69.12 |
| 5,438,178 | A | 8/1995 | Buhler et al. | |
| 5,556,554 | A * | 9/1996 | Morishita | B23H 7/02 219/69.12 |
| 6,774,334 | B1 * | 8/2004 | Kobayashi | B23H 7/065 219/69.12 |
| 9,409,245 | B2 * | 8/2016 | Nakagawa | B23H 1/02 |
| 9,895,759 | B2 * | 2/2018 | Hashimoto | B23H 7/02 |
| 9,950,379 | B2 * | 4/2018 | Miyake | B23H 7/101 |
| 10,029,324 | B2 * | 7/2018 | Niu | B23H 7/065 |
| 2006/0163210 | A1 * | 7/2006 | Asai | B23H 7/20 219/69.13 |
| 2011/0100959 | A1 * | 5/2011 | Onodera | B23H 7/065 219/69.13 |
| 2011/0226742 | A1 | 9/2011 | Onodera et al. | |
| 2013/0238114 | A1 * | 9/2013 | Hiraga | G05B 19/19 700/193 |
| 2014/0364992 | A1 * | 12/2014 | Abe | B23H 7/20 700/162 |
| 2015/0183039 | A1 * | 7/2015 | Irie | B23H 7/20 219/69.12 |
| 2015/0239055 | A1 * | 8/2015 | Niu | G05B 19/4103 219/69.12 |
| 2016/0263688 | A1 | 9/2016 | Hashimoto et al. | |
| 2017/0139389 | A1 | 5/2017 | Inukai | |
| 2020/0001384 | A1 * | 1/2020 | Shirai | B23H 7/065 |
| 2020/0150632 | A1 * | 5/2020 | Takemoto | B23H 7/102 |

FOREIGN PATENT DOCUMENTS

| | | | |
|---|---|---|---|
| JP | 04176516 | A | 6/1992 |
| JP | 06262438 | A | 9/1994 |
| JP | H11-333633 | A | 12/1999 |
| JP | 2000-280122 | A | 10/2000 |
| JP | 5622977 | B1 | 11/2014 |
| WO | 2010050014 | A1 | 5/2010 |

OTHER PUBLICATIONS

Extended European Search Report issued Jan. 16, 2025, by the European Patent Office in corresponding European Patent Application No. 21936961.8-1201. (14 pages).

Office Action (The First Office Action) issued Sep. 26, 2025, by the State Intellectual Property Office of People's Republic of China in corresponding Chinese Patent Application No. 202180096817.1 and an English translation of the Office Action. (9 pages).

Notice of Allowance (Decision to Grant a Patent) issued Jan. 14, 2025, by the Japan Patent Office in corresponding Japanese Patent Application No. 2023-514259 and an English translation of the Notice of Allowance. (5 pages).

* cited by examiner

FIG. 6

| MACHINING CONDITION | MACHINING CONDITION | VOLTAGE | ON-TIME | FEED SPEED | SHAPE |
|---|---|---|---|---|---|
| S1 | ROUGH MACHINING | 100 | 8 | 3.0 | |
| S2 | SEMI-FINISHING (FIRST SEMI-FINISHING) | 80 | 6 | 5.0 | |
| S3 | SEMI-FINISHING (SECOND SEMI-FINISHING) | 70 | 4 | 6.0 | |
| ⋮ | ⋮ | ⋮ | ⋮ | ⋮ | ⋮ |
| S21 | UNMACHINED PART 1 | 90 | 6 | 3.5 | FOR CORNER |
| S22 | UNMACHINED PART 2 | 85 | 6 | 4.0 | FOR GROOVE |

NUMERICAL CONTROL DEVICE AND COMPUTER READABLE STORAGE MEDIUM

CROSS REFERENCE TO RELATED APPLICATIONS

This is the U.S. National Phase application of PCT/JP2021/015521, filed Apr. 15, 2021, the disclosure of this application being incorporated herein by reference in its entirety for all purposes.

FIELD OF THE INVENTION

The present invention relates to a numerical control device and a computer readable storage medium that control an electric discharge machine.

BACKGROUND OF THE INVENTION

Conventionally, there have been electric discharge machines that use an electrical discharge phenomenon between a workpiece and a traveling electrode to perform machining. In electric discharge machining, once a material is cut out, machining is repeated so as to trace the side face of the workpiece twice or three times, and thereby the shape accuracy is improved, and the roughness of the machined surface is reduced.

In repetition of machining, the energy of electric discharge machining determined by the voltage value (or value of current) and the value of pulse durations is gradually reduced in the order of rough machining, semi-finishing, and final finishing. In a stage of rough machining, since the machined surface is not planar, the machined surface is gradually planarized while the voltage value (or value of current) or the value of pulse durations is gradually reduced. The distance between poles where electric charge occurs is referred to as a discharge gap and can be predicted from a machining condition such as a value of current or a pulse duration. In electric discharge machining, a radius compensation amount based on a predicted value is set as a machining radius to perform creation of a compensation path or determination of excessive cutting.

Patent Literature 1 discloses "A wire electric discharge machining apparatus comprises a machining unit configured to separate an outer frame part from a machined article and thereby form a product part, which is an inner part, and a control device 2 configured to control the machining unit. The machining unit separates the product part from the outer frame part by machining a first boundary region of a boundary, which is a part of the boundary between the outer frame part and the product part left as an uncut part, and, after a member to be the product part and a member to be the outer frame part are connected by an electroconductive member, then machining a second boundary region, which is the uncut part of the boundary, and also repeats machining multiple times on the first boundary region and repeats machining multiple times on the second boundary region when machining the machined article. The control device 2 sets different machining conditions between a first machining condition in the n-th machining on the first boundary region and a second machining condition in the n-th machining on the second boundary region based on the machining status when the first boundary region has been machined, where n is a natural number greater than or equal to two."

PATENT LITERATURE

Patent Literature 1: Japanese Patent No. 5622977

SUMMARY OF THE INVENTION

As illustrated in Patent Literature 1, in wire electric discharge machining, an uncut part is intentionally created, a part other than the uncut part is machined, and the uncut part is then finally cut to separate a product part (core) therefrom. In Patent Literature 1, the machining condition before separating the core and the machining condition when separating the core are changed to improve the machining accuracy.

The machining conditions differ for rough machining, semi-finishing, and final finishing, respectively. Since the machining path varies in accordance with a machining condition, some machining conditions may cause an unmachined part to occur. Even when a machining condition suitable for each machining is set, if an unmachined part occurs in rough machining, the unmachined part has to be machined in semi-finishing. Thus, this causes a mismatch between a machining condition and a machining target.

In the field of electric discharge machines, there is a demand for a technology of performing machining under suitable machining conditions.

Solution to Problem

A numerical control device that is one aspect of the present disclosure is a numerical control device that controls electric discharge machining, and the numerical control device includes: a program path creation unit that analyzes a machining program consisting of a plurality of machining processes including rough machining, semi-finishing machining, and final finishing machining and creates a program path for each of the machining processes; a machining condition storage unit that stores a plurality of machining conditions suited to the machining processes and at least one machining condition suited to an unmachined part; and a machining condition change unit that, when an unmachined part occurs in a prior machining process, changes a machining condition for the current machining processes to a machining condition adapted to the unmachined part.

A computer readable storage medium that is one aspect of the present disclosure stores a computer readable instruction configured to: when executed by one or a plurality of processors, analyze a machining program consisting of a plurality of machining processes including rough machining, semi-finishing machining, and final finishing machining and create a program path for each of the machining processes; store a plurality of machining conditions suited to the machining processes and at least one machining condition suited to an unmachined part; and when an unmachined part occurs in a prior machining process, change a machining condition for the current machining processes to a machining condition adapted to the unmachined part.

According to one aspect of the present invention, electric discharge machining can be performed under suitable machining conditions.

BRIEF DESCRIPTION OF DRAWINGS

FIG. 6 is a diagram illustrating an example of machining conditions.

DETAILED DESCRIPTION OF EMBODIMENTS OF THE INVENTION

Figure 1:
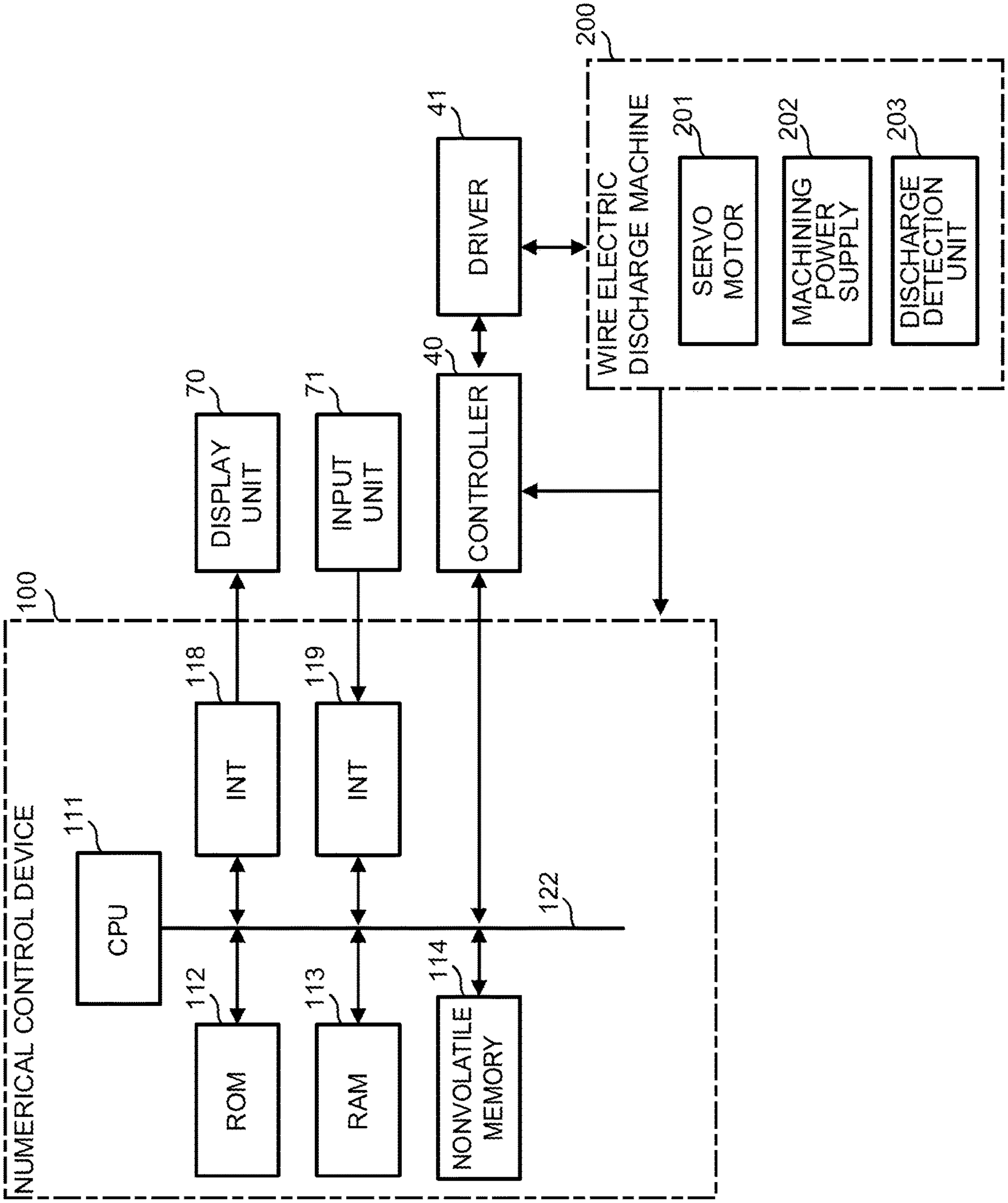
FIG. 1 is a diagram illustrating a hardware configuration of a numerical control device.

The hardware configuration of a numerical control device 100 that controls a wire electric discharge machine 200 will be described with reference to FIG. 1. Note that the wire electric discharge machine 200 is illustrated as an example of the present disclosure. The present disclosure is generally applicable to electric discharge machining including die-sinking electric discharge machining.

A CPU 111 included in the numerical control device 100 is a processor that controls the numerical control device 100 as a whole. The CPU 111 loads a modified system program into a ROM 112 via a bus 122 and controls the overall numerical control device 100 according to the system program. A RAM 113 temporarily stores temporal calculation data or display data, various data input by a user via an input unit 71, or the like.

A display unit 70 is a monitor or the like attached to the numerical control device 100. The display unit 70 displays an operation window, a setup window, or the like of the numerical control device 100.

The input unit 71 is a keyboard, a touch panel, or the like integrated with the display unit 70 or separated from the display unit 70. The user may operate the input unit 71 to perform entry or the like to a window displayed in the display unit 70. Note that the display unit 70 and the input unit 71 may come with a mobile terminal.

A nonvolatile memory 114 is a memory that is backed up by a battery (not illustrated) or the like, for example, and whose storage status is held even when the numerical control device 100 is powered off. The nonvolatile memory 114 stores a program loaded from an external device via an interface (not illustrated) or a program input via the input unit 71 or various data acquired from each unit of the numerical control device 100, the electric discharge machine 200, or the like (for example, setup parameters or the like acquired from the electric discharge machine 200). The program or various data stored in the nonvolatile memory 114 may be loaded into the RAM 113 when executed or used. Further, various system programs are written in the ROM 112 in advance.

A controller 40 that controls a wire or a table of the wire electric discharge machine 200 converts an axis motion instruction from the CPU 111 into a pulse signal and outputs the pulse signal to a driver 41. The driver 41 converts the pulse signal into current to drive a servo motor of the wire electric discharge machine 200. The servo motor moves the wire or the table under control of the numerical control device 100. By controlling the servo motor, it is possible to control the discharge gap or the wire speed described later.

A machining power supply 202 applies a voltage between an upper power feed contact and a machined article and between a lower power feed contact and the machined article. The wire electric discharge machine 200 performs electric discharge machining on a workpiece by generating electric discharge between the workpiece mounted on a table and a wire electrode. The voltage or current applied to the wire varies in accordance with machining conditions described later.

A discharge detection unit 203 measures waveforms of the discharge voltage and discharge current between poles. The discharge detection unit 203 is an oscilloscope or a current sensor, for example. An oscilloscope can visualize an electrical discharge phenomenon occurring between poles. A current sensor measures the discharge current flowing in a power supply line.

The numerical control device 100 adjusts the wire speed based on whether or not normal discharge is taking place, whether or not short-circuit is occurring, or whether or not the continuous discharge state is taking place, which is determined based on a discharge voltage or discharge current acquired from the discharge detection unit 203.

Figure 2:
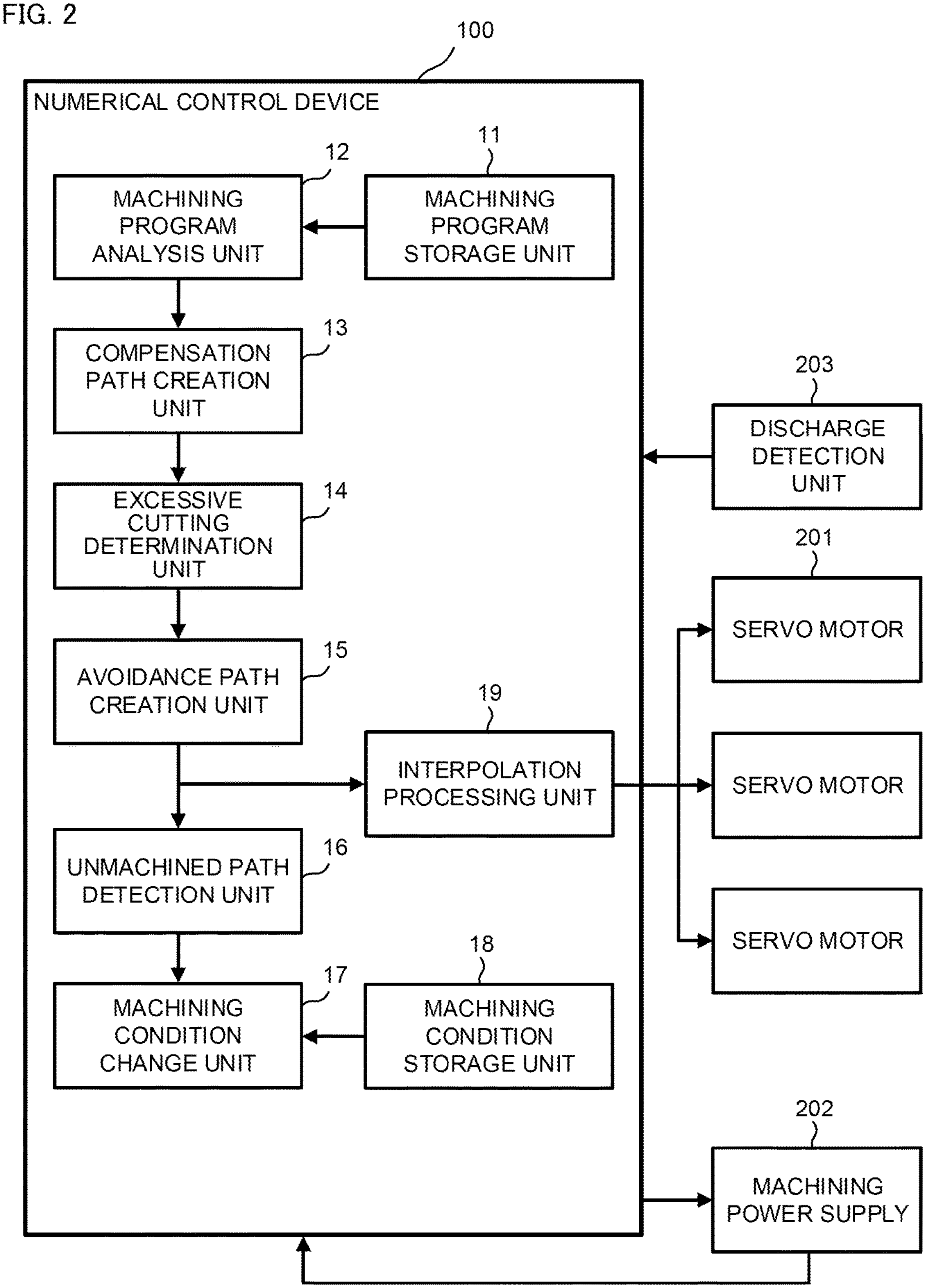
FIG. 2 is a block diagram of the numerical control device.

FIG. 2 is a block diagram of the numerical control device 100. The numerical control device 100 includes a machining program storage unit 11, a machining program analysis unit 12, a compensation path creation unit 13, an excessive cutting determination unit 14, an avoidance path creation unit 15, an unmachined path detection unit 16, a machining condition change unit 17, a machining condition storage unit 18, and an interpolation processing unit 19.

Figure 3:
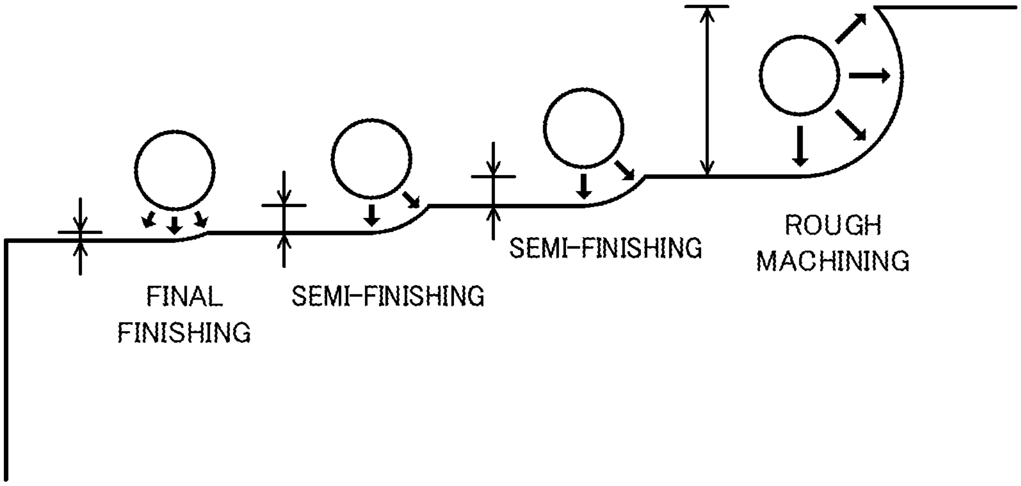
FIG. 3 is a diagram illustrating a program path.

The machining program analysis unit 12 creates a program path based on a machining program stored in the machining program storage unit 11. The program path differs in accordance with a machining process. FIG. 3 illustrates an example of a program path. The first machining process is rough machining, the second machining process is semi-finishing machining (first semi-finishing machining), the third machining process is semi-finishing machining (second semi-finishing machining), and the fourth machining process is final finishing.

A finishing allowance is often set in rough machining to semi-finishing. When a finishing allowance is set in the machining program, the program path is shifted by the finishing allowance. In general, a large finishing allowance is left in rough machining, the finishing allowance is reduced in semi-finishing, and the finishing allowance is reduced to zero in final finishing.

The compensation path creation unit 13 corrects a program path based on an amount of wire diameter compensation. The amount of wire diameter compensation refers to a wire machining radius. In wire diameter compensation, a path (compensation path) shifted from the program path by the amount of wire diameter compensation is created. The amount of wire diameter compensation differs in accordance with machining conditions. In general, the amount of wire diameter compensation in rough machining is larger, and the amount of wire diameter compensation in final finishing is smaller.

In the case of the present disclosure, a compensation path for rough machining is created in the first machining process, a compensation path for semi-finishing machining (first semi-finishing machining) is created in the second machining process, a compensation path for semi-finishing machining (second semi-finishing machining) is created in the third machining process, and a compensation path for final finishing is created in the fourth machining process.

The excessive cutting determination unit 14 determines whether or not there is a part where excessive cutting is expected to occur in a path resulted after wire diameter compensation.

Figure 4A:
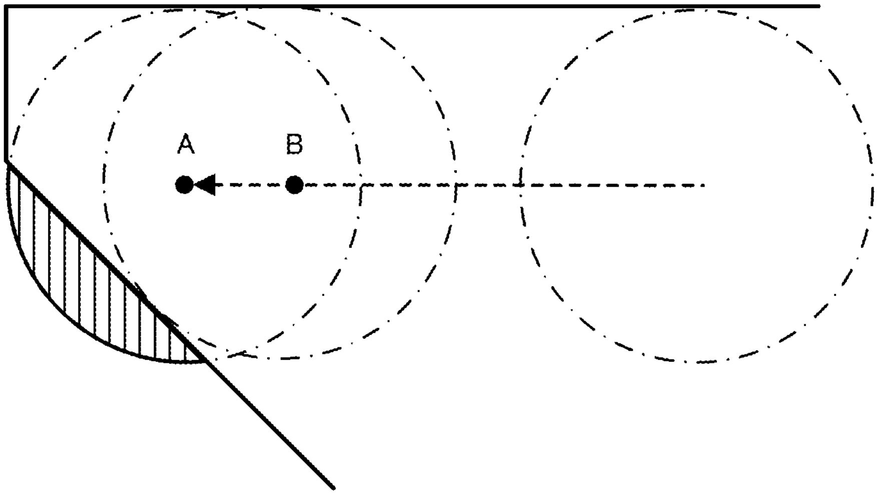
FIG. 4A is a diagram illustrating a relationship between a machining radius and excessive cutting (with excessive cutting occurring).
Figure 4B:
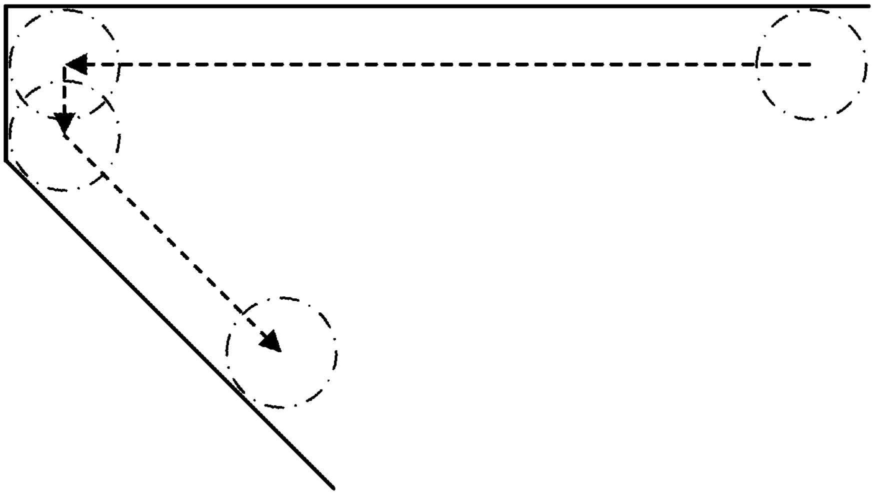
FIG. 4B is a diagram illustrating a relationship between a machining radius and excessive cutting (without excessive cutting).

FIGS. 4A and 4B illustrate relationships between the machining radius and excessive cutting. In the program path of FIG. 4A, machining is performed straight from the right to the left in the drawing sheet and then performed diagonally from the point A to the lower right in the drawing sheet. Machining following the compensation path causes excessive cutting to occur at the point B. In FIG. 4B, the machining condition is changed to reduce the voltage or current and thereby reduce the wire machining radius. The reduced machining radius does not cause excessive cutting to occur. Since the machining radius is large and the finishing allowance is also large in rough machining, excessive cutting is likely to occur, and an unmachined part is likely to occur.

Figure 5:
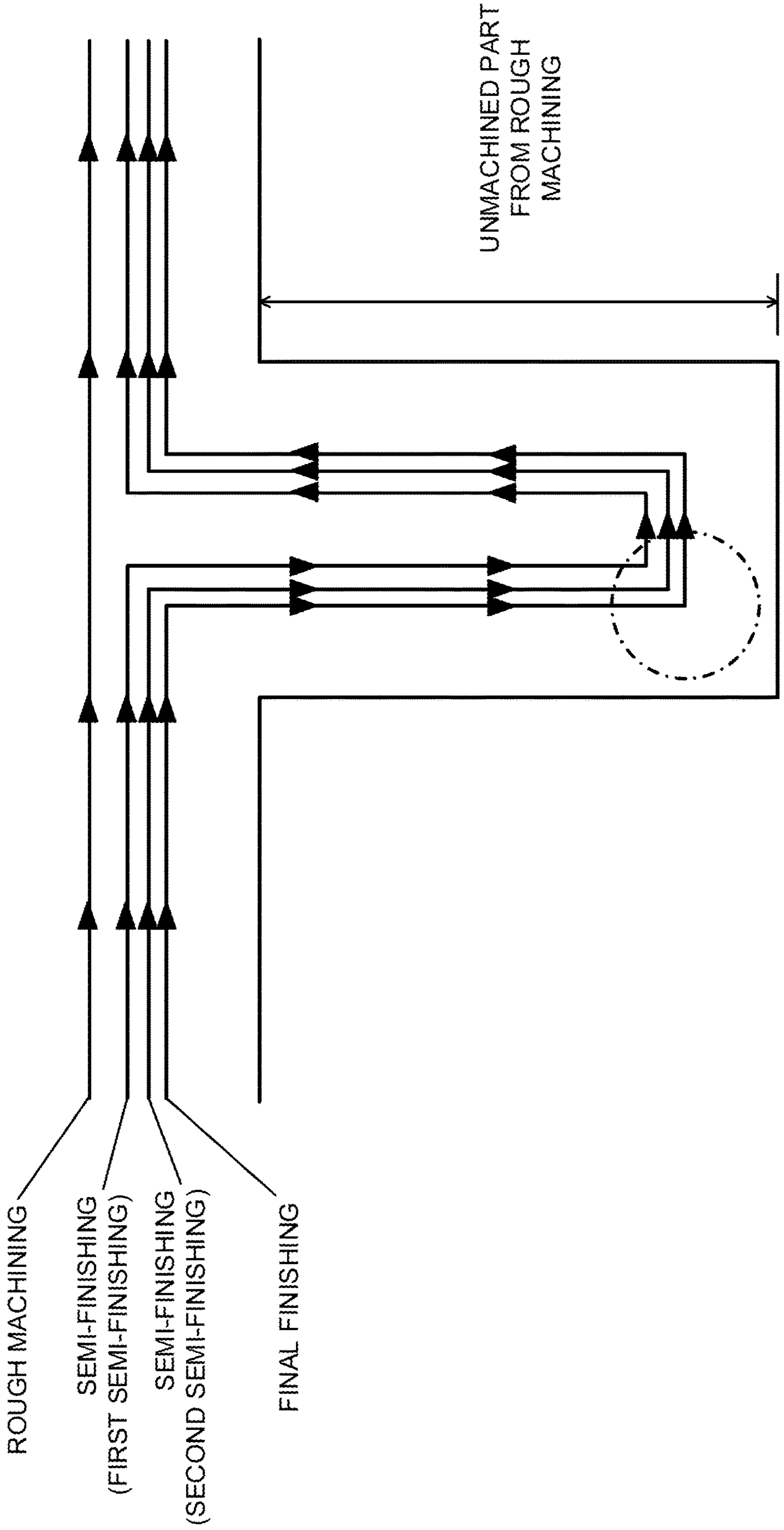
FIG. 5 is a diagram illustrating an example of an avoidance path.

The avoidance path creation unit 15 creates a path (avoidance path) for avoiding excessive cutting. FIG. 5 is an example of the avoidance path. In the case of FIG. 5, in rough machining, since excessive cutting is expected to occur, an avoidance path avoiding hole drilling is created. In the next machining (semi-finishing (first semi-finishing)), since no excessive cutting is expected to occur, no avoidance path is created, and the compensation path is employed. In also the subsequent machining (semi-finishing (second semi-finishing) and final finishing), since no excessive cutting is expected to occur, no avoidance path is created, and the compensation path is employed.

The unmachined path detection unit 16 compares a compensation path with an avoidance path to detect an unmachined path. The unmachined path detection unit 16 stores information related to unmachined parts (unmachined part-related information).

The machining condition change unit 17 reads unmachined part-related information obtained in the previous machining and selects a machining condition suited to a machining shape of an unmachined part. The following (1) to (3) are procedures to select a machining condition. When an unmachined part occurs in the previous machining, (1) the machining condition change unit 17 compares the compensation path for the current machining with the avoidance path for the previous machining to determine the shape of the unmachined part. (2) The machining condition change unit 17 determines whether or not the unmachined part resulted from rough machining is machined for the first time in the current machining. (3) When the machining condition is changed and the unmachined part is machined, it is determined whether or not excessive cutting is expected to occur. The machining condition change unit 17 changes the machining condition if all the conditions of (1) to (3) are satisfied.

The process of (1) to (3) will be specifically described.

The numerical control device 100 stores machining conditions as illustrated in FIG. 6. The machining conditions include a normal machining condition such as rough machining, semi-finishing (first semi-finishing), semi-finishing (second semi-finishing), final finishing, and the like and a machining condition for an unmachined part. For each machining condition, “voltage”, “on-time”, “feed speed”, “amount of wire diameter compensation”, and the like are set. The machining conditions for an unmachined part are set on a shape basis, such as “for corner” or “for groove”. The machining condition “S21” is “for corner”, and the machining condition “S22” is “for groove”. The machining condition change unit 17 compares the compensation path for the previous machining with the avoidance path for the previous machining to determine the machined shape and reads a machining condition corresponding to the machining path. In the example of the present disclosure, the machining condition change unit 17 reads “groove machining” machining condition “S22”.

Figure 7:
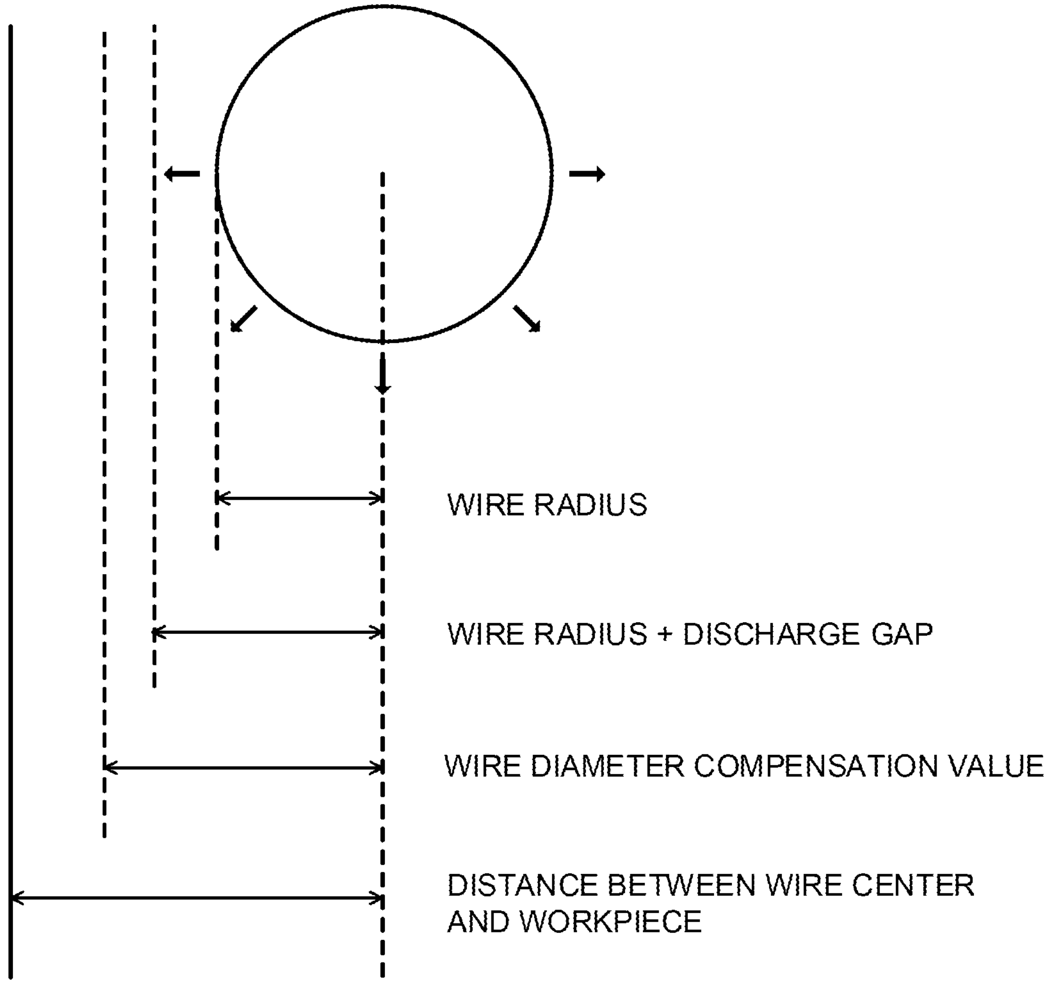
FIG. 7 is a diagram illustrating a relationship between a discharge gap and an amount of wire diameter compensation.

The machining condition change unit 17 determines whether or not excessive cutting is expected to occur in the read machining condition. As illustrated in FIG. 7, a clearance referred to as a “discharge gap” is present between the wire and the machined surface. The “discharge gap” is a clearance where electric discharge occurs. A change of a machining condition causes a change in the size of the “discharge gap”. The machining radius corresponds to “wire radius+discharge gap”. The “wire radius” is a radius of a wire used for machining. When the wire is changed between rough machining and finishing machining, the “wire radius” is also changed. The “amount of wire diameter compensation”, “wire radius+discharge gap”, and “machining radius” are substantially the same. A change of a machining condition causes a change in the machining radius, and there is a likelihood of excessive interruption. To avoid the excessive interruption, the machining condition change unit 17 determines whether or not excessive cutting is expected to occur in a new machining condition. If no excessive cutting is expected to occur, the current machining condition is changed to the machining condition for an unmachined part.

During electric discharge machining, the discharge gap is maintained substantially constant. The numerical control device 100 performs feedback control to maintain the discharge gap constant by controlling the wire speed. An excessively short distance between the wire and the workpiece will cause short-circuit. When the wire speed decreases due to a mismatch between a machining condition and an amount of machining, the numerical control device 100 reduces the wire speed and maintains the discharge gap constant.

Figure 8A:
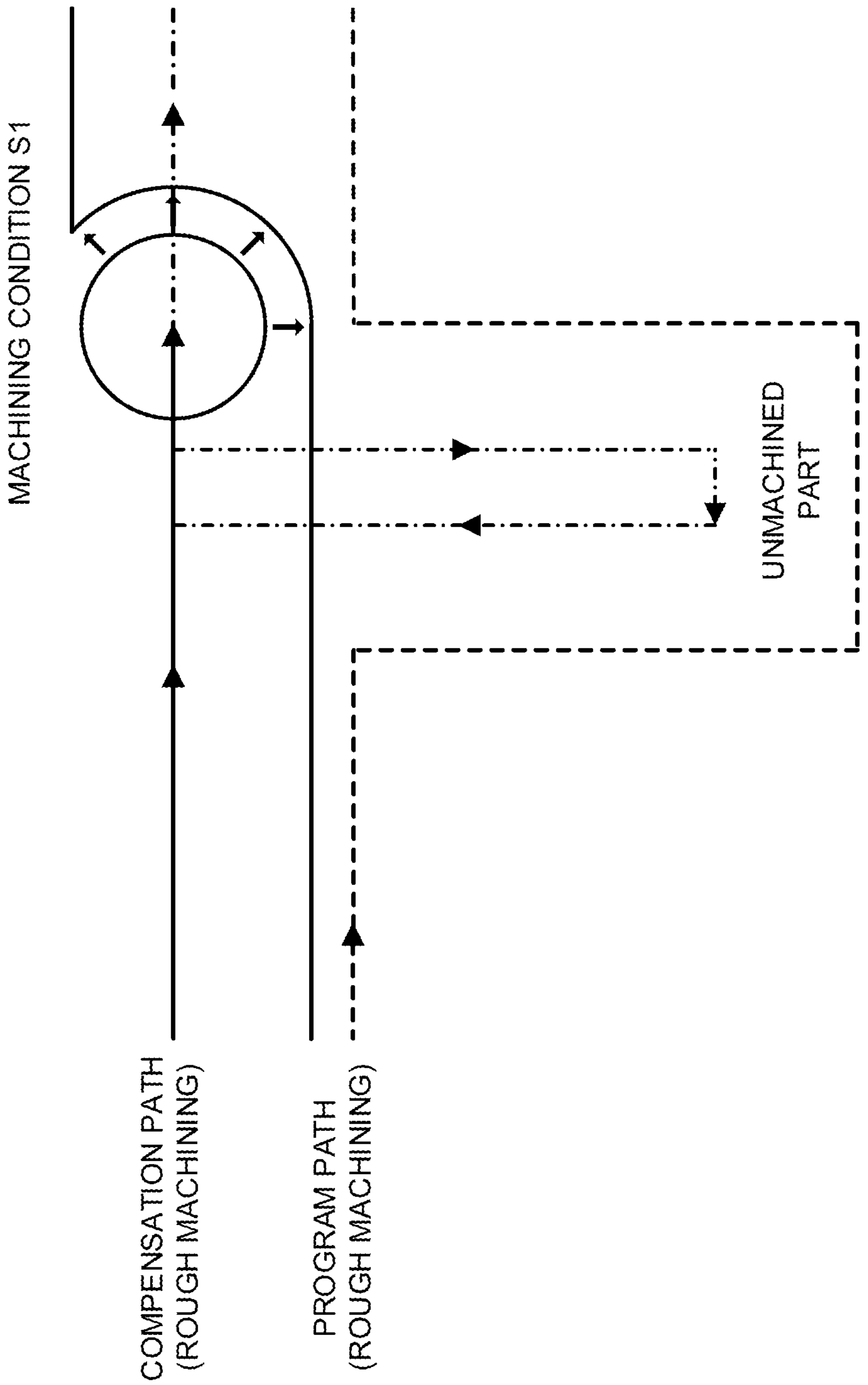
FIG. 8A is a diagram illustrating occurrence of an unmachined part in rough machining.
Figure 8B:
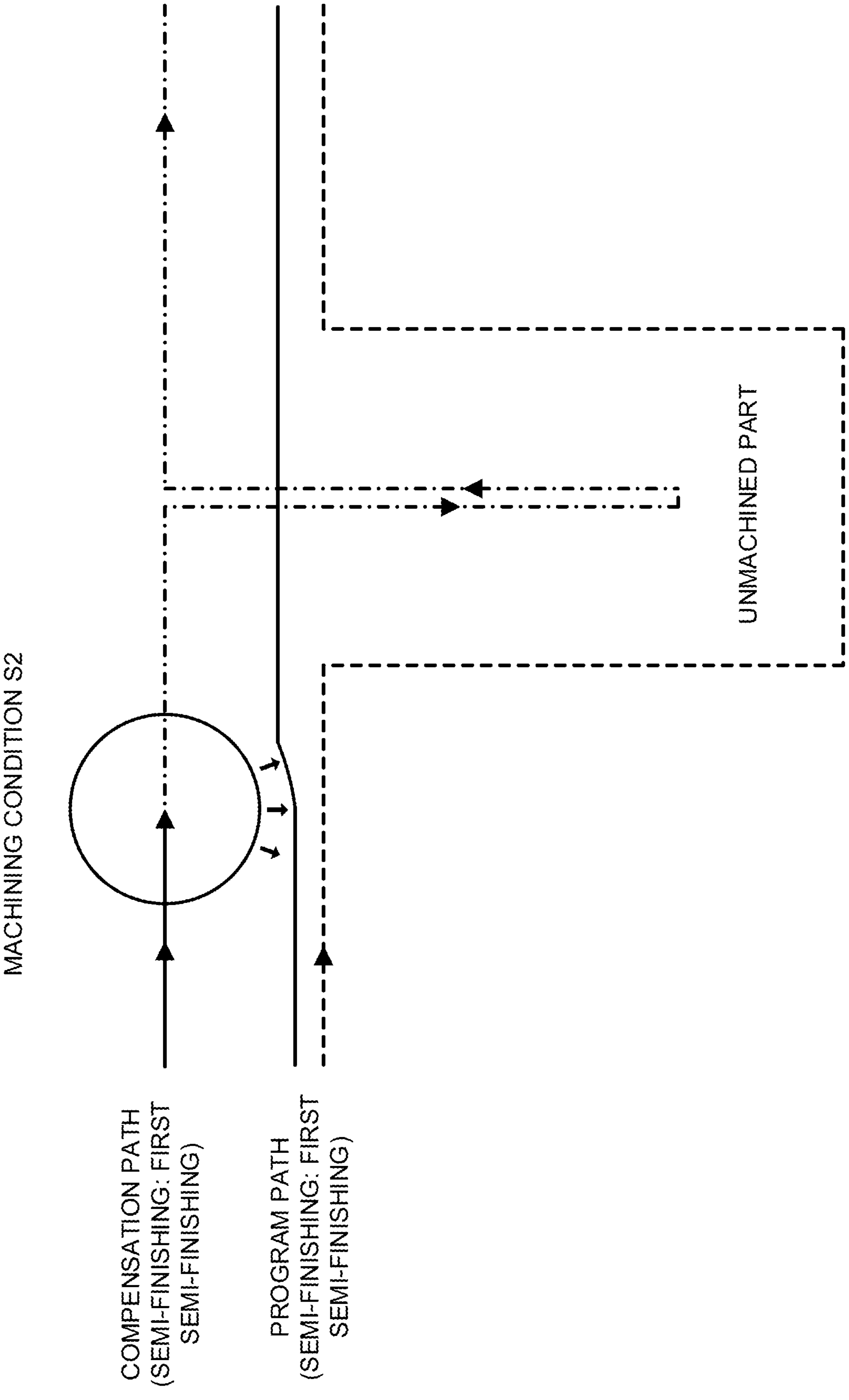
FIG. 8B is a diagram of machining on an already-machined part in semi-finishing.
Figure 8C:
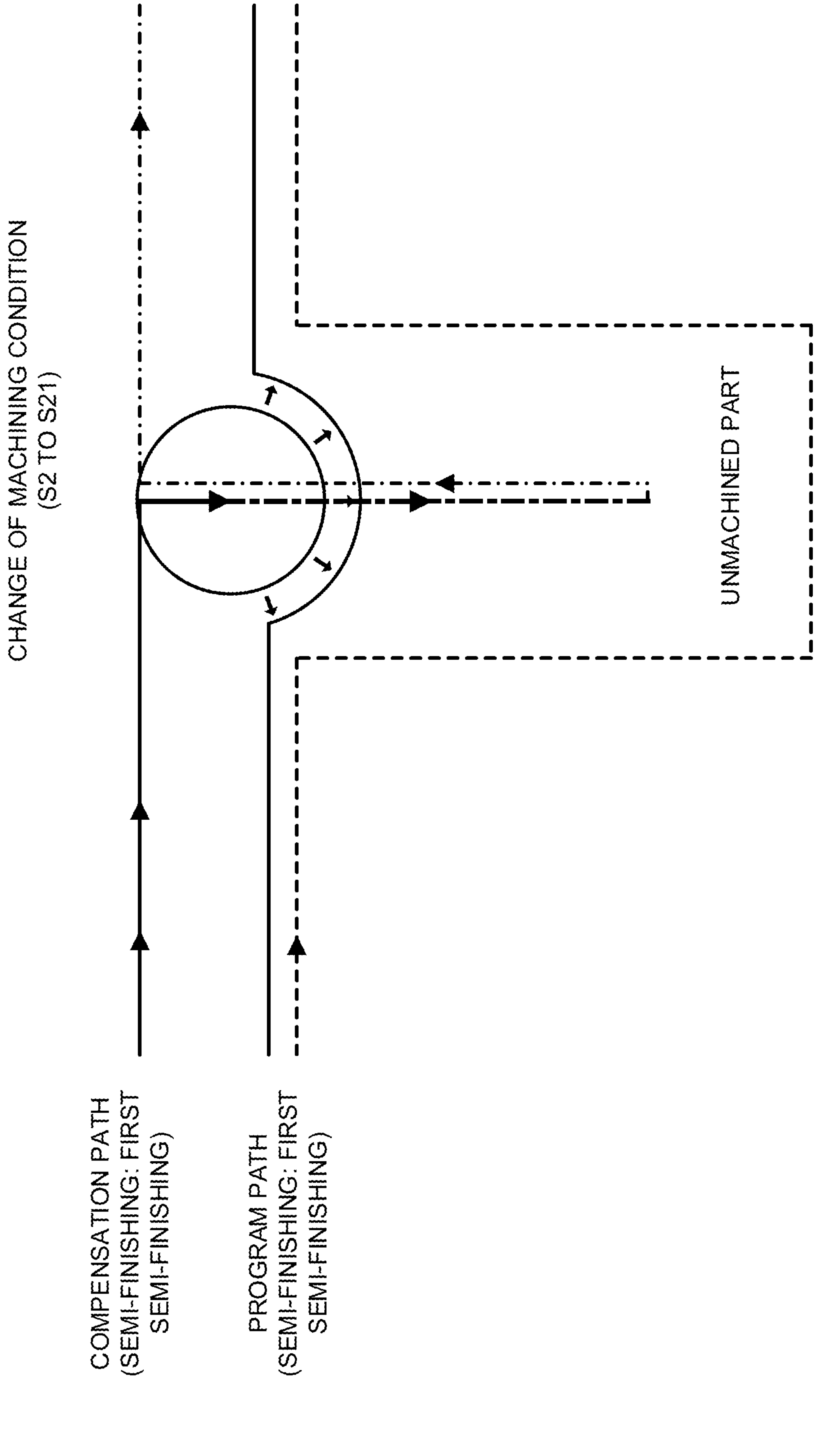
FIG. 8C is a diagram of machining of an unmachined part in semi-finishing.

How the machining condition for an unmachined part is changed will be described with reference to FIGS. 8A to 8C.

In rough machining, determining that excessive cutting is expected to occur, the numerical control device 100 creates an avoidance path for avoiding the excessive cutting. The wire is moved along the avoidance path, and an unmachined part occurs (FIG. 8A). When the rough machining ends, semi-finishing (first semi-finishing) is started. In the semi-finishing (first semi-finishing), machining is performed under the machining condition for finishing machining "S2: semi-finishing (first semi-finishing)" (FIG. 8B). When the wire comes close to an unmachined part, the numerical control device 100 starts a process of changing machining conditions. The numerical control device 100 compares the compensation path for the previous machining with the avoidance path for the previous machining to determine the machined shape. The numerical control device 100 selects the machining condition "S22: unmachined part (for groove)" corresponding to the machined shape and determines whether or not excessive cutting is expected to occur under this machining condition. If the numerical control device 100 determines that no excessive cutting is expected to occur, the numerical control device 100 changes the machining conditions and machines the unmachined part (FIG. 8C).

There also are methods of (4), (5), and (6) as methods for determining whether or not excessive cutting is expected.

(4) When the current machining is final finishing machining, the machining condition is not changed. In final finishing machining, the finishing allowance is zero. An increase in the machining voltage in final finishing will cause excessive cutting. Thus, the machining condition is not changed in the final finishing.

Figure 9A:
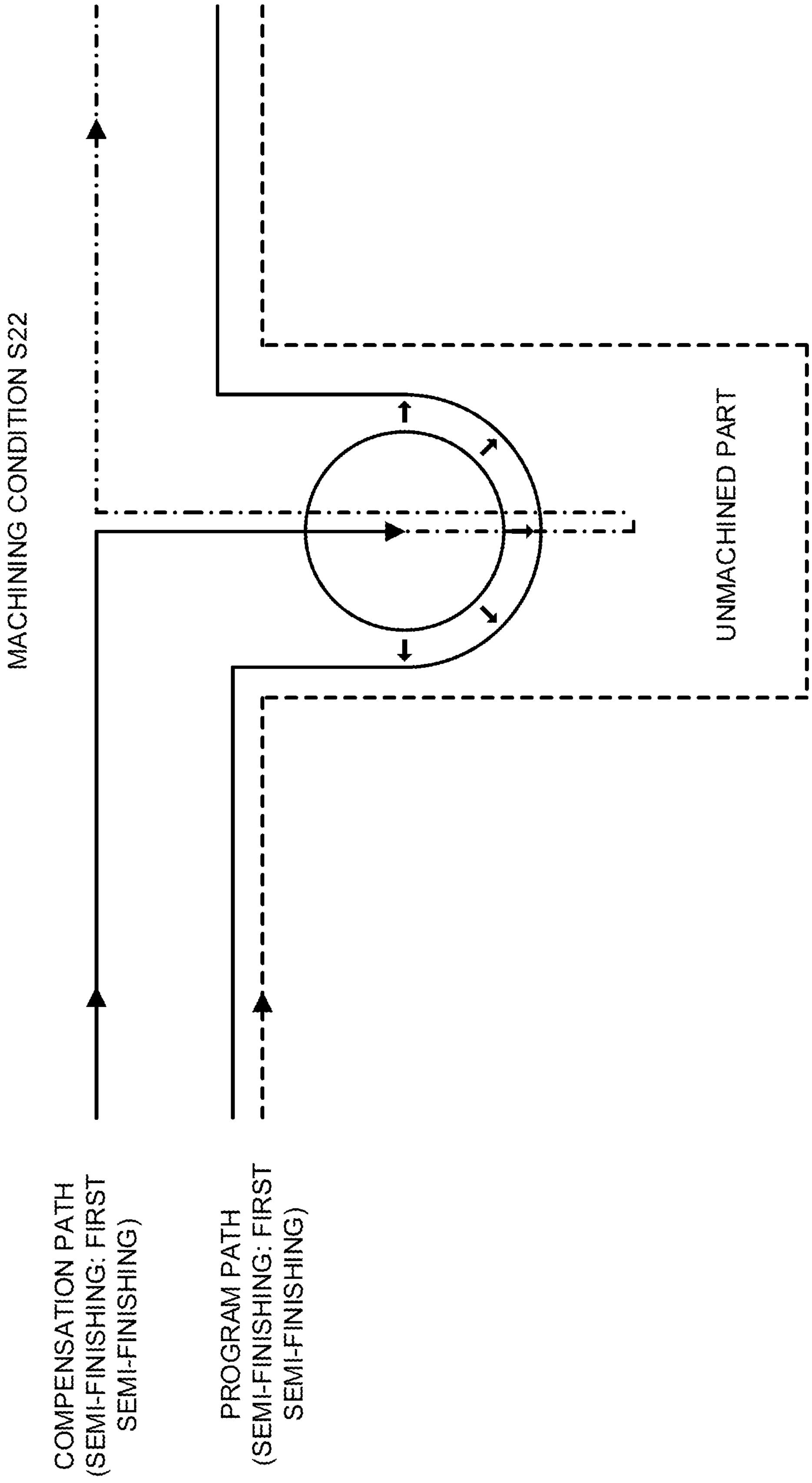
FIG. 9A is a diagram of machining of a forward route in groove machining under a machining condition for an unmachined part.
Figure 9B:
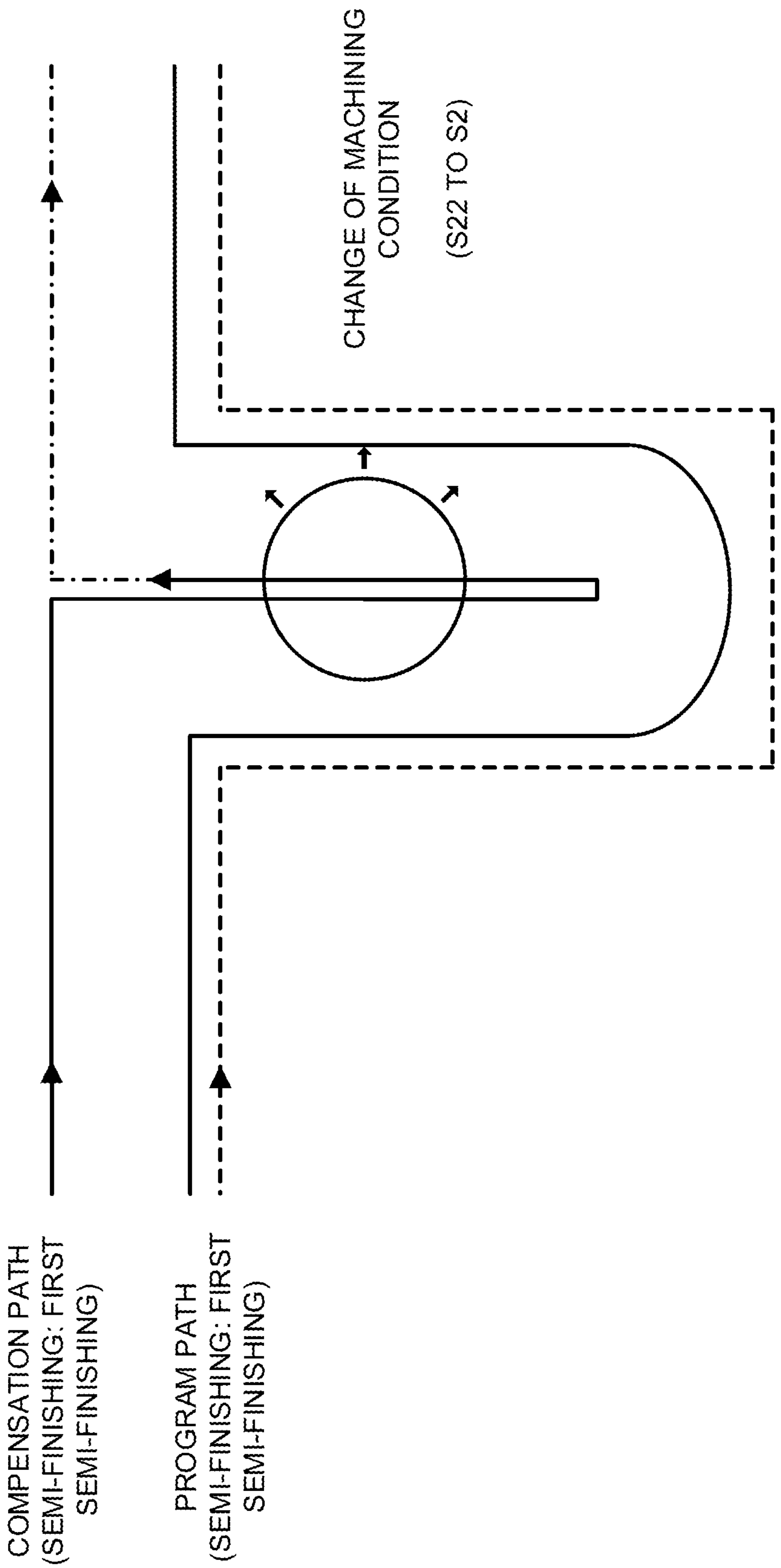
FIG. 9B is a diagram of machining of a return route in groove machining under a machining condition for semi-finishing.

(5) For some machined shapes, the machining condition is switched between the forward route and the return route. In a case of groove machining, while an unmachined part is machined in the forward route (FIG. 9A), finishing machining is performed in the return route on a part that has been once machined (FIG. 9B). Thus, the machining condition is switched between the forward route and the return route. In accordance with the machining conditions of FIG. 6, the machining condition "S22: unmachined part (for groove)" is selected in the forward route, and this is switched to the machining condition "S2: semi-finishing (first semi-finishing)" in the return route.

Figure 10A:
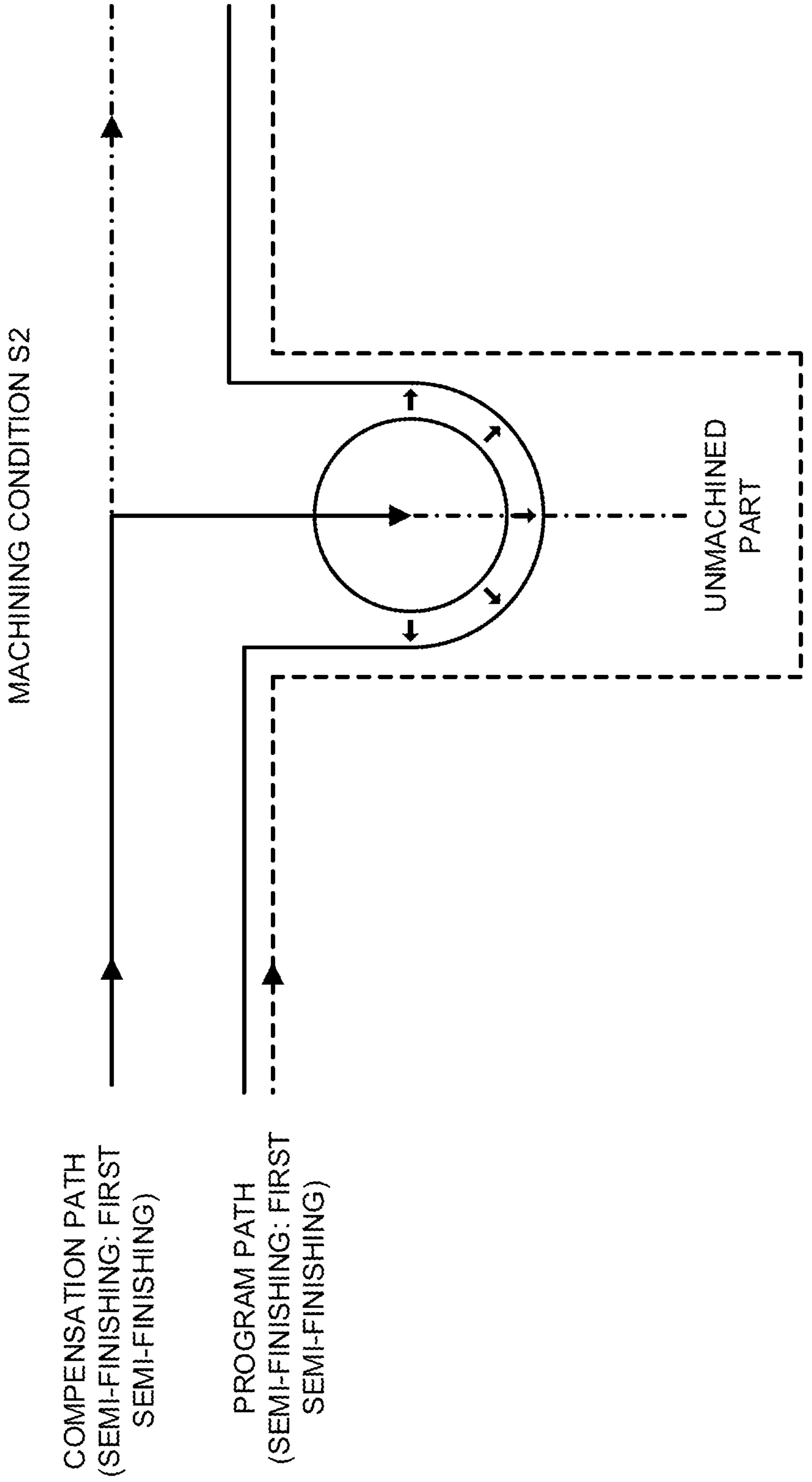
FIG. 10A is a diagram of machining of a forward route in groove machining under a machining condition for semi-finishing.
Figure 10B:
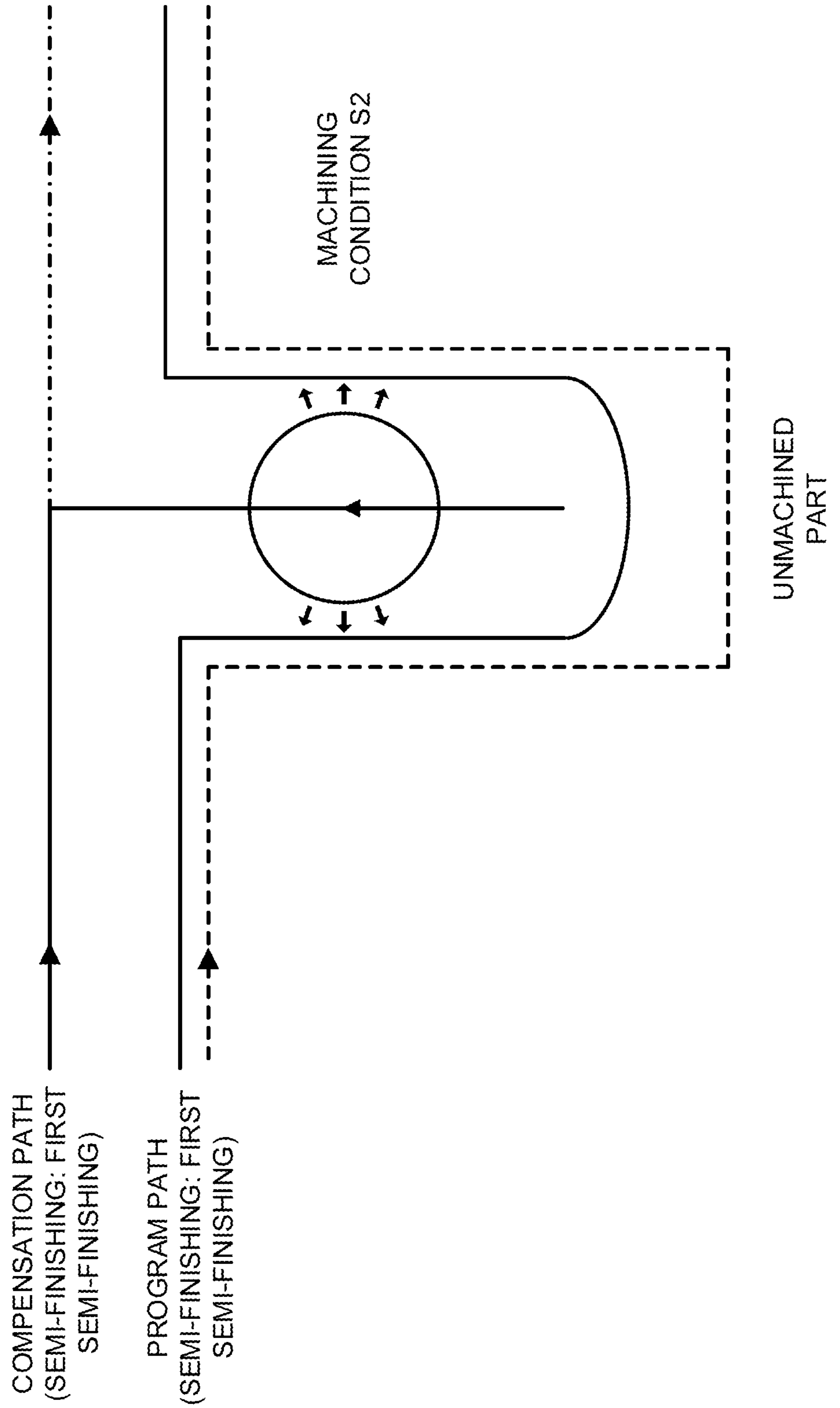
FIG. 10B is a diagram of machining of a return route in groove machining under a machining condition for semi-finishing.

(6) When only two times of machining of rough machining and final finishing are performed, the machining condition is not changed. As with FIG. 10A, when a unmachined part resulted from the rough machining is machined in the final finishing, an increase in the voltage will cause the length of "wire radius+discharge gap" to be larger than "distance between wire center and workpiece", which may result in excessive cutting. In such a case, the machining condition is not changed. In also the case of the return route (FIG. 10B), since there is no unmachined part, the machining condition is not changed.

Advantageous effects of the present disclosure will be described in comparison with conventional groove machining.

Figure 11A:
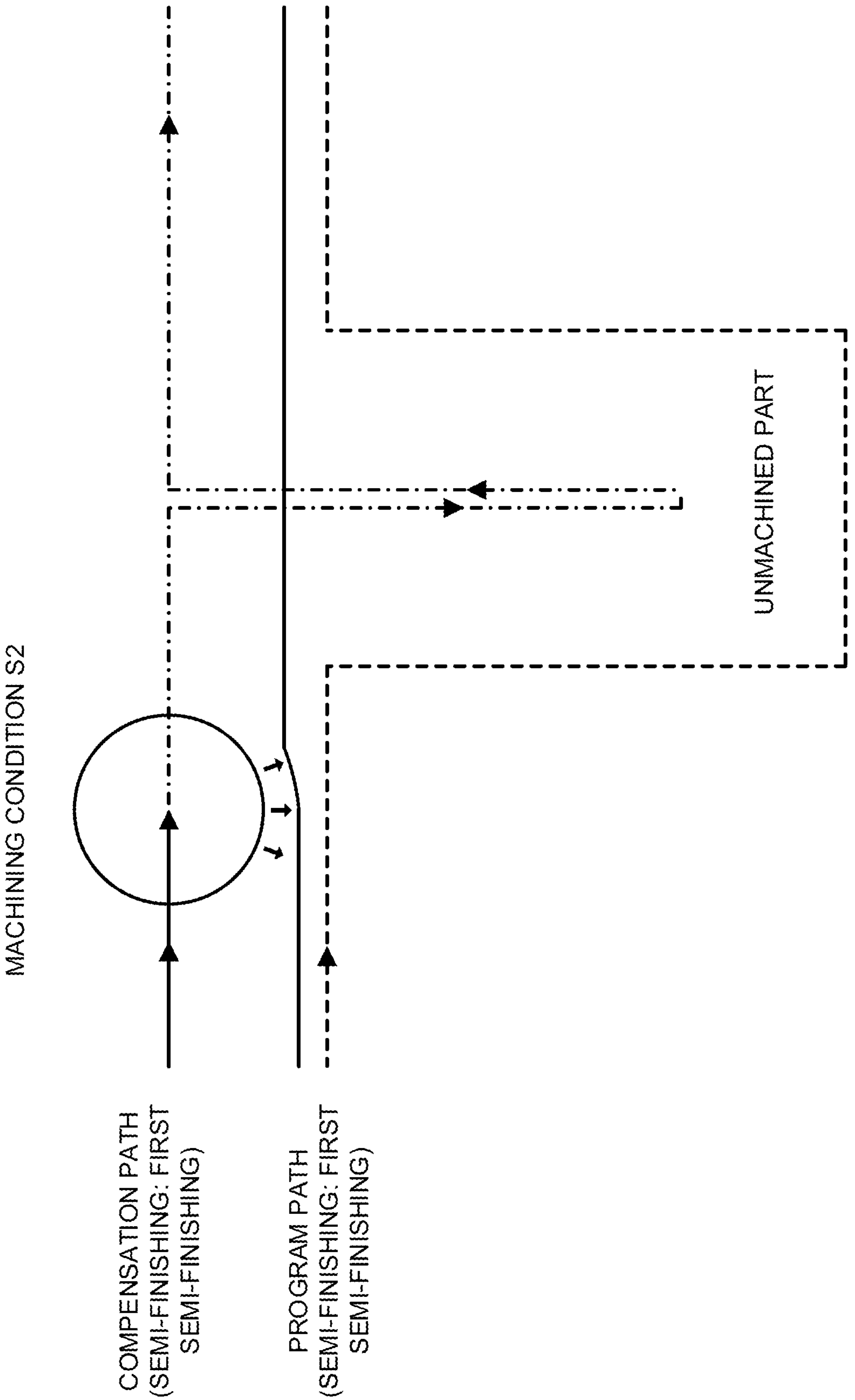
FIG. 11A is a diagram illustrating occurrence of an unmachined part is rough machining.
Figure 11B:
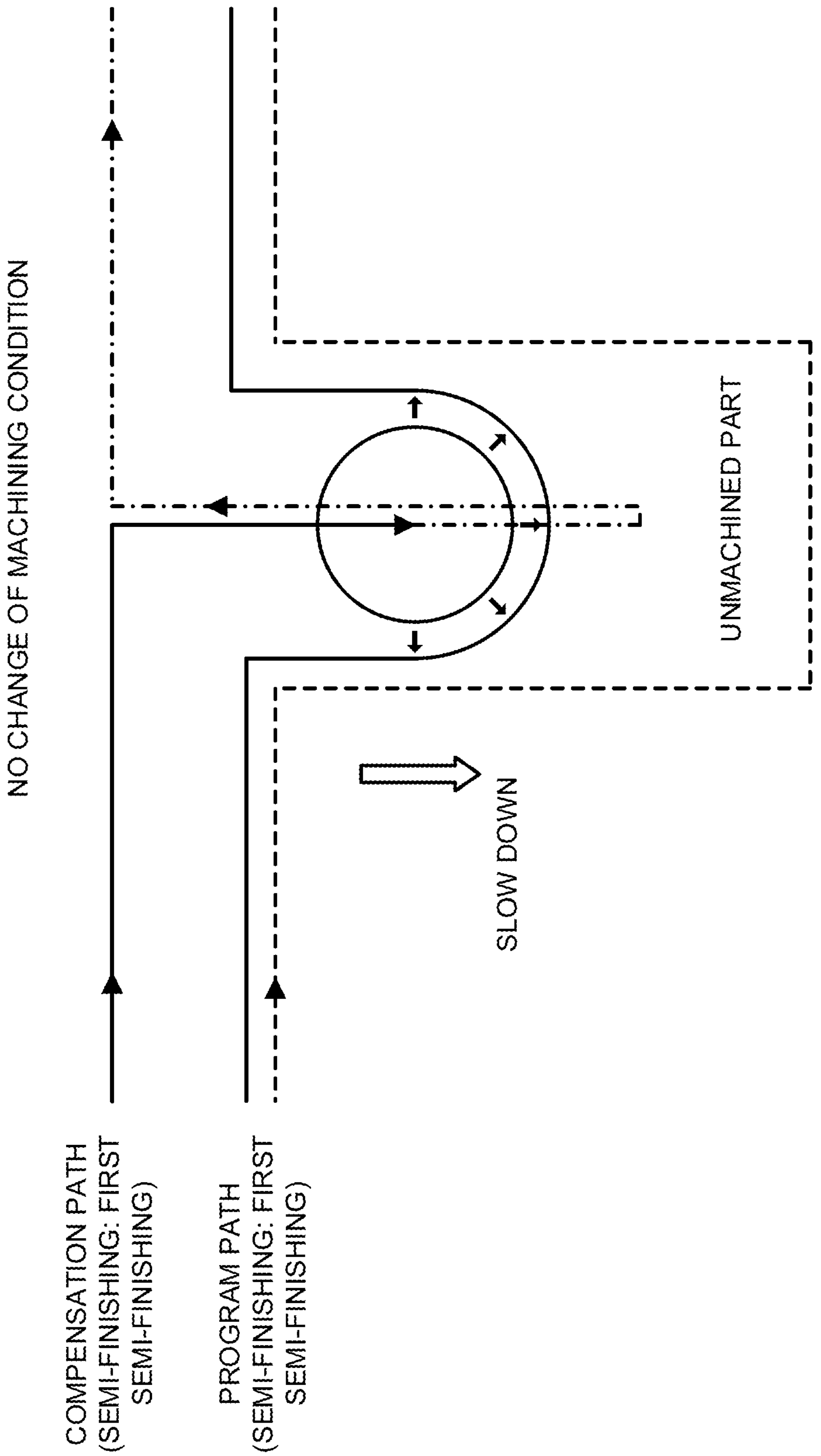
FIG. 11B is a diagram illustrating conventional machining on an unmachined part.

FIGS. 11A and 11B illustrate the conventional wire electric discharge machining. It is assumed that an unmachined part has occurred in groove machining in rough machining. In the semi-finishing (first semi-finishing) subsequent to the rough machining, machining is started under the machining condition "S2: semi-finishing (first semi-finishing)" (FIG. 11A). Then, even after reaching the unmachined part, the provided machining condition "S2: semi-finishing (first semi-finishing)" is still applied to machine the unmachined part (FIG. 11B). The amount of machining on the unmachined part is greater than the amount of machining in the finishing machining, a mismatch between the actual machining and the machining condition occurs, and the wire speed decreases. Further, the distance between the wire and the workpiece becomes shorter, and this increases the likelihood of short-circuit of the wire. When the distance between the wire and the workpiece becomes shorter, the instruction response of feedback control is also slower in order to maintain the discharge gap constant.

The numerical control device 100 of the present disclosure detects occurrence of an unmachined part resulted from the previous machining and, when machining the unmachined part in the current machining, changes the machining condition to a machining condition suitable for the unmachined part. This n prevent a reduction in the machining speed or frequent occurrence of short-circuit.

In the present disclosure, by changing machining conditions, determination is made so as not to cause excessive cutting to occur even with an increased machining radius for wire electric discharge machining.

Figure 12:
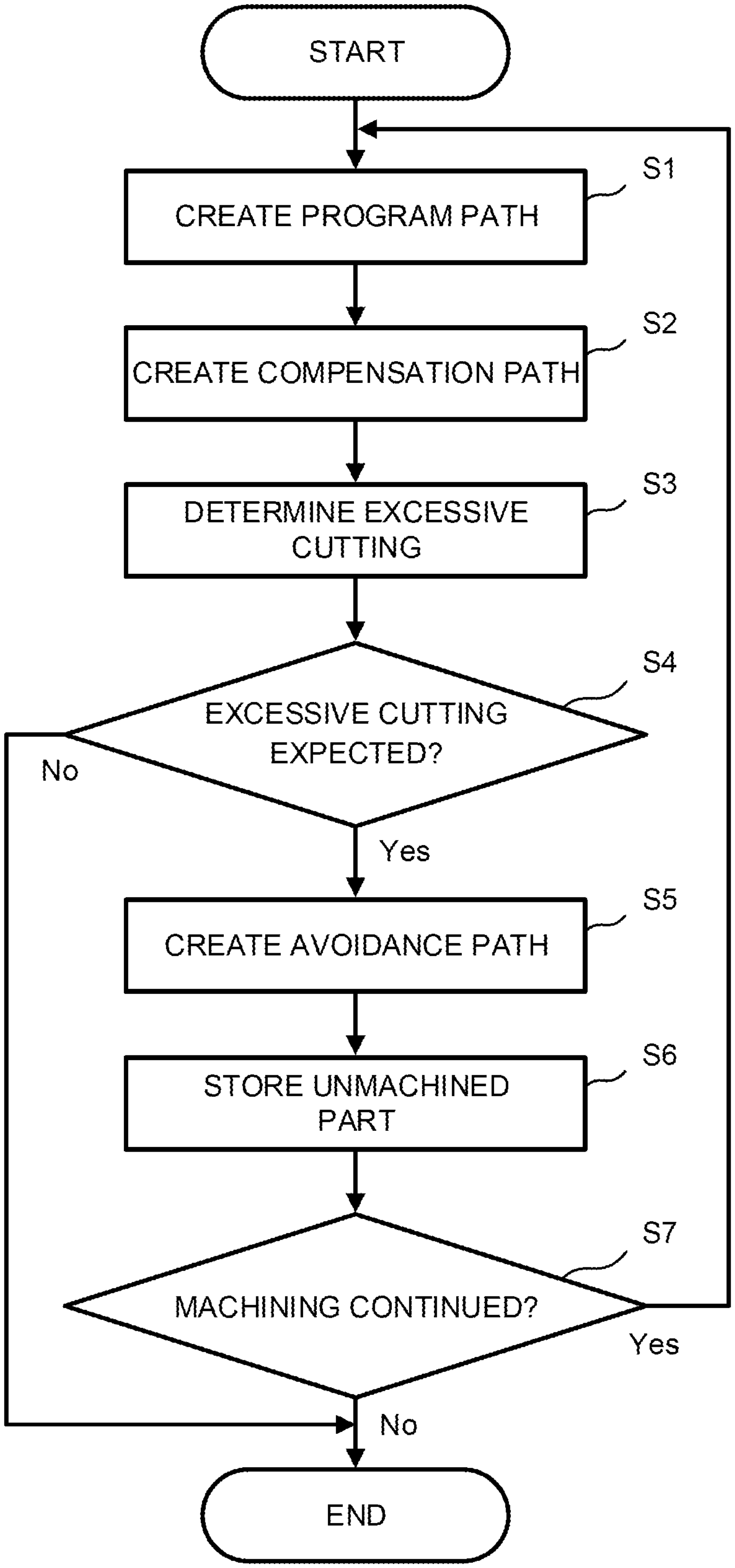
FIG. 12 is a flowchart illustrating a process of recording information related to unmachined parts.

The process of recording information related to an unmachined part during machining will be described with reference to FIG. 12.

The machining program analysis unit 12 analyzes a machining program and creates a program path (step S1). In step S1, a program path for rough machining, a program path for semi-finishing machining, or a program path for final finishing may be created. Herein, description will be provided assuming that a program path for rough machining is created.

The compensation path creation unit 13 corrects a program path based on the amount of wire diameter compensation to create a compensation path (step S2).

The excessive cutting determination unit determines whether or not there is a part where excessive cutting is expected to occur in the compensation path (step S3). If it is determined that the excessive cutting is expected to occur (step S4; Yes), the avoidance path creation unit 15 creates a path (avoidance path) for avoiding the excessive cutting (step S5).

The unmachined path detection unit 16 compares the compensation path with the avoidance path to detect an unmachined part. The unmachined path detection unit 16 stores information related to the unmachined part, such as position information on the unmachined part (step S6).

If the numerical control device 100 continues the machining (step S7; Yes), the numerical control device 100 proceeds with the process to step S1 and creates a program path. If the numerical control device 100 ends the machining (step S7; No), the numerical control device 100 ends the process of recording information related to the unmachined part.

Figure 13:
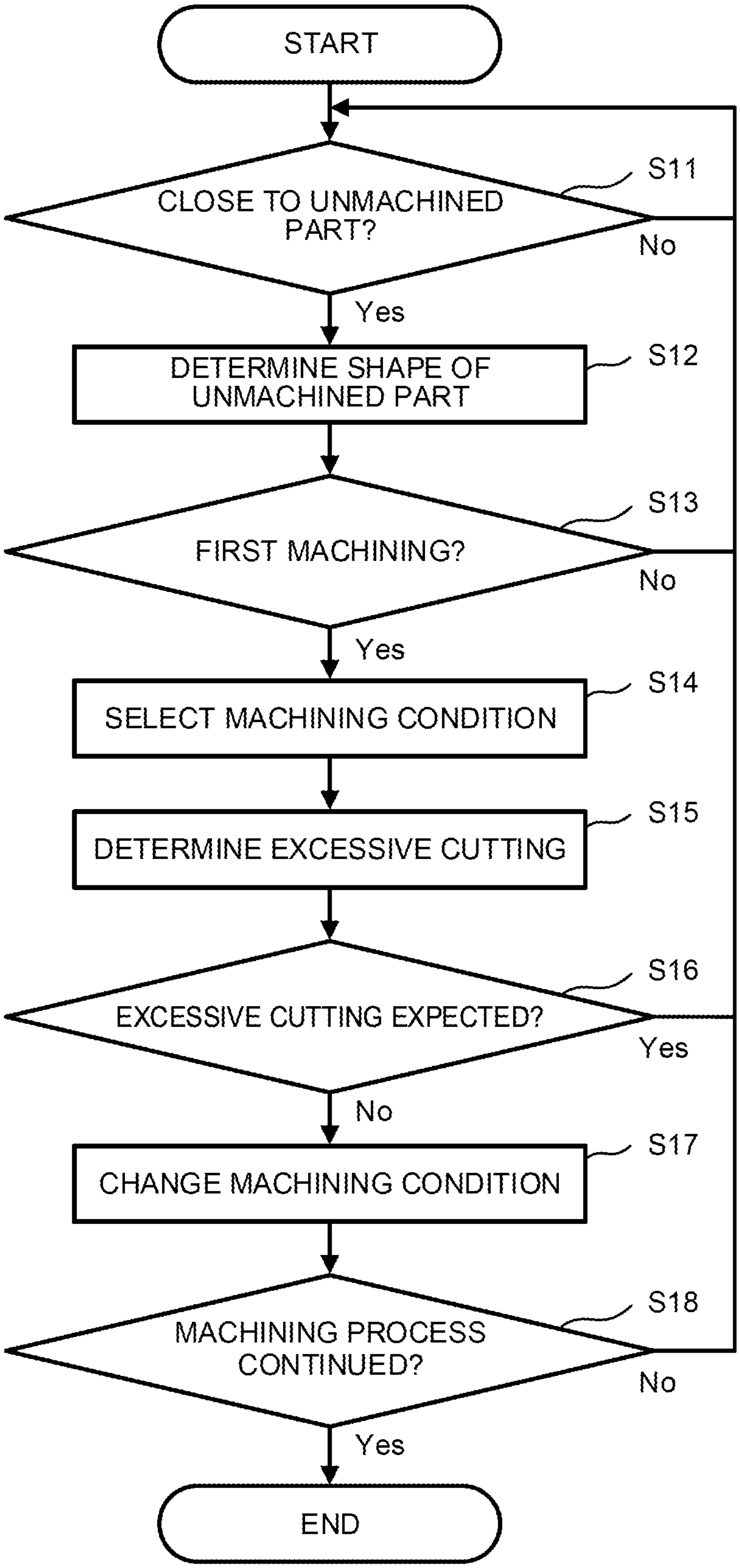
FIG. 13 is a flowchart illustrating a process of changing machining conditions.

The process of changing machining conditions will be described with reference to the flowchart of FIG. 13. It is assumed that the previous machining has ended before changing machining conditions. The previous machining means a machining process taken place before the current machining process.

The machining condition change unit 17 determines based on unmachined part-related information whether or not the current machining comes close to an unmachined part resulted from the previous machining. If the position of the current machining is not close to the unmachined part (step S11; No), monitoring is continued. If the position of the current machining is close to the unmachined part (step S11; Yes), the machining condition change unit 17 determines the machined shape of the unmachined part (step S12). The machined shape may be a "groove", a "corner", or the like but is not limited thereto.

The machining condition change unit 17 determines whether or not the unmachined part is resulted from rough machining. Since the unmachined part resulted from rough machining requires a large amount of machining, a machining condition to provide a larger amount of machining than finishing machining is suited.

If the unmachined part is resulted from rough machining (step S13; Yes), the machining condition change unit 17 selects a machining condition suited to the machined shape of the unmachined part from the machining condition storage unit 18 (step S14). The machining condition change unit 17 determines whether or not excessive cutting is expected to occur under the machining condition in accordance with the machined shape of the unmachined part (step S15).

If excessive cutting is expected to occur (step S16; Yes), the machining condition is not changed, and the process proceeds to step S11. If no excessive cutting is expected to occur (step S16; No), the machining condition is changed (step S17).

Herein, if the current machining process ends (step S18; Yes), the process of changing machining conditions ends. If the current machining process is ongoing (step S18; No), the process proceeds to step S11, and the process of changing machining conditions is continued.

As described above, in a wire electric discharge machining in which multiple times of machining are repeated to machine a single workpiece, the numerical control device 100 of the present disclosure determines the shape of an unmachined part when the unmachined part is resulted from the previous machining, selects a machining condition suited to the shape of the unmachined part, and determines whether or not excessive cutting is expected to occur when machining is performed under the selected machining condition. If excessive cutting is expected to occur, the numerical control device 100 does not change the machining condition. If no excessive cutting is expected to occur, the numerical control device 100 changes the machining condition.

The numerical control device 100 may be provided with a function of determining whether or not the current machining is final finishing and, if the current machining is final finishing, not changing the machining condition.

A function of changing the machining condition in the forward route but not changing the machining condition in the return route when machining involves reciprocating motion may be provided.

A function of not changing the machining condition when the width of a groove in "groove machining" is equal to "wire radius+discharge gap" may be provided.

The present disclosure is also applicable to overall electric discharge machining including die-sinking electric discharge machining. The wire electric discharge machining is electric discharge machining in which a wire serves as a tool electrode. The tool electrode may be any conductor (metal) having a shape other than a wire. In die-sinking electric discharge machining, an electrode is used instead of a wire. In also die-sinking electric discharge machining, an unmachined part may occur in the same manner as in wire electric discharge machining. In such a case, the machining condition is changed to machine the unmachined part under a suitable machining condition. An amount of compensation in the common electric discharge machining is defined as the amount of electrode shape compensation. The amount of electrode shape compensation is the shape of an electrode plus the amount of a discharge gap. The amount of wire diameter compensation is a type of amounts of electrode shape compensation. The amount of electrode shape compensation is used for compensation of a program path, creation of an avoidance path, or determination of excessive cutting.

LIST OF REFERENCE SYMBOLS

100 numerical control device
11 machining program storage unit
12 machining program analysis unit
13 compensation path creation unit
16 unmachined path detection unit
17 machining condition change unit
18 machining condition storage unit
111 CPU
112 ROM
113 RAM
114 nonvolatile memory
201 servo motor
202 machining power supply
203 discharge detection unit

The invention claimed is:

1. A numerical control device that controls electric discharge machining, the numerical control device comprising:
a processor configured to:
analyze a machining program consisting of a plurality of machining processes including rough machining, semi-finishing machining, and final finishing machining and create a program path for each of the machining processes;
store a plurality of machining conditions suited to the machining processes and at least one machining condition suited to an unmachined part of a workpiece,
wherein the processor creates the program path to correct the program path for each of the machining processes based on an amount of wire diameter compensation to create a compensation path;
determine whether or not there is a part of the workpiece where excessive cutting is expected to occur in the compensation path; and
in response to the determination that the excessive cutting is expected to occur, the processor is further configured to create an avoidance path for avoiding the excessive cutting, determine that the unmachined part of the workpiece occurs based on the avoidance path; and
change a machining condition for the current machining processes to a machining condition adapted to the unmachined part of the workpiece when the unmachined part of the workpiece occurs, wherein the numerical control device is operated under the changed machining condition to cut the unmachined part.

2. The numerical control device according to claim 1, wherein the processor is further configured to:
create a compensation path corrected from the program path by an amount of electrode shape compensation;
determine whether or not excessive cutting is expected to occur when the compensation path is used for machining;
create an avoidance path that is a path for avoiding the excessive cutting; and
detect an unmachined part from the compensation path and the avoidance path.

3. The numerical control device according to claim 1,
wherein the processor stores a shape of the unmachined part and a machining condition in association with each other, and
changes a machining condition to a machining condition corresponding to the shape of the unmachined part of the workpiece.

4. The numerical control device according to claim 1, wherein the processor determines whether or not a change to the machining condition for the unmachined part causes excessive cutting to occur and, when excessive cutting is expected to occur, does not change a machining condition.

5. The numerical control device according to claim 1, wherein when the current machining process is final finishing machining, the processor does not change a machining condition.

6. The numerical control device according to claim 1, wherein when machining the unmachined part of the workpiece in forward and return paths, the processor does not change a machining condition for the return path.

7. A non-transitory machine-readable storage medium storing a computer readable instruction when executed by one or a plurality of processors causes the one or the plurality of processors to:

analyze a machining program consisting of a plurality of machining processes including rough machining, semi-finishing machining, and final finishing machining and create a program path for each of the machining processes;

store a plurality of machining conditions suited to the machining processes and at least one machining condition suited to an unmachined part of a workpiece, wherein the program path for each of the machining processes is analyzed by correcting the program path for each of the machining processes based on an amount of wire diameter compensation to create a compensation path;

determine whether or not there is a part where excessive cutting is expected to occur in the compensation path; and in response to a determination that the excessive cutting is expected to occur, create an avoidance path for avoiding the excessive cutting, determine that the unmachined part of the workpiece occurs based on the avoidance path, and change a machining condition for the current machining processes to a machining condition adapted to the unmachined part of the workpiece when the unmachined part of the workpiece occurs, wherein a numerical control device is operated under the changed machining condition to cut the unmachined part.

8. The non-transitory machine-readable storage medium storing the computer readable instruction according to claim 7 wherein the one or the plurality of processors are further caused to:

create a compensation path corrected from the program path by an amount of electrode shape compensation;

determine whether or not excessive cutting is expected to occur when the compensation path is used for machining;

create an avoidance path that is a path for avoiding the excessive cutting; and detect an unmachined part of the workpiece from the compensation path and the avoidance path.

* * * * *